United States Patent
Choi et al.

(10) Patent No.: US 7,415,528 B2
(45) Date of Patent: Aug. 19, 2008

(54) APPARATUS AND METHOD FOR TRANSMITTING HIERARCHICALLY MULTIMEDIA DATA TS TO PREVENT JITTER OF TIMING INFORMATION AND FOR RECOVERING THE MULTIMEDIA DATA TS

(75) Inventors: Dong-Joon Choi, Daejon (KR); Nae-Soo Kim, Daejon (KR)

(73) Assignee: Electronics and Telecommunications Research Institute, Gajeong-Dong, Yusong-Gu Daejon (KR)

( * ) Notice: Subject to any disclaimer, the term of this patent is extended or adjusted under 35 U.S.C. 154(b) by 812 days.

(21) Appl. No.: 10/983,081

(22) Filed: Nov. 4, 2004

(65) Prior Publication Data
US 2005/0141559 A1 Jun. 30, 2005

(30) Foreign Application Priority Data
Dec. 27, 2003 (KR) ............ 10-2003-0098279
Jun. 15, 2004 (KR) ............ 10-2004-0044016

(51) Int. Cl.
*G06F 15/16* (2006.01)
(52) U.S. Cl. ............ 709/231; 709/223; 709/224; 725/115; 370/516
(58) Field of Classification Search ........ 709/231, 709/232, 203, 217, 219, 223, 224; 725/115, 725/116; 370/516, 517
See application file for complete search history.

(56) References Cited

U.S. PATENT DOCUMENTS

| | | | |
|---|---|---|---|
| 5,835,493 A * | 11/1998 | Magee et al. ........ 370/395.62 |
| 5,914,962 A | 6/1999 | Fimoff et al. | |
| 6,377,588 B1 | 4/2002 | Osaki | |
| 6,678,332 B1 * | 1/2004 | Gardere et al. ........ 375/240.26 |
| 2002/0059630 A1 | 5/2002 | Salo et al. | |
| 2002/0136219 A1 * | 9/2002 | Ding et al. ........ 370/394 |
| 2004/0215804 A1 * | 10/2004 | Tan ........ 709/231 |
| 2004/0215805 A1 * | 10/2004 | Tan et al. ........ 709/231 |
| 2005/0076136 A1 * | 4/2005 | Cho et al. ........ 709/231 |

FOREIGN PATENT DOCUMENTS

KR 20010105387 A 11/2001

OTHER PUBLICATIONS

The 5th Conference on Electronics and Information Communications, 8 pages.
EBU Technical Review—Apr. 2003, pp. 1-13.

* cited by examiner

*Primary Examiner*—Lashonda T Jacobs
(74) *Attorney, Agent, or Firm*—Blakely, Sokoloff, Taylor & Zafman, LLP

(57) ABSTRACT

An apparatus and a method for transmitting multimedia transport stream hierarchically and recovering the multimedia transmission stream are disclosed. The apparatus includes: an input matching unit for dividing the multimedia data transport stream into packets; a sequence number inserting unit for inserting a sequence number to the packet; an error check code (ECC) inserting unit for inserting an ECC to the sequence number inputted packet, to thereby generate a user packet; a layer information storing unit for storing layer information for the user packet; a layer dividing unit for dividing the user packet; a layer storing unit for storing the divided user packet in each layer; and a hierarchical framing and transmitting unit for generating a hierarchical transport frame by combining a predetermined number of the user packets with the layer information, and transmitting the hierarchical frame in a different transmission method for a different layer.

15 Claims, 14 Drawing Sheets

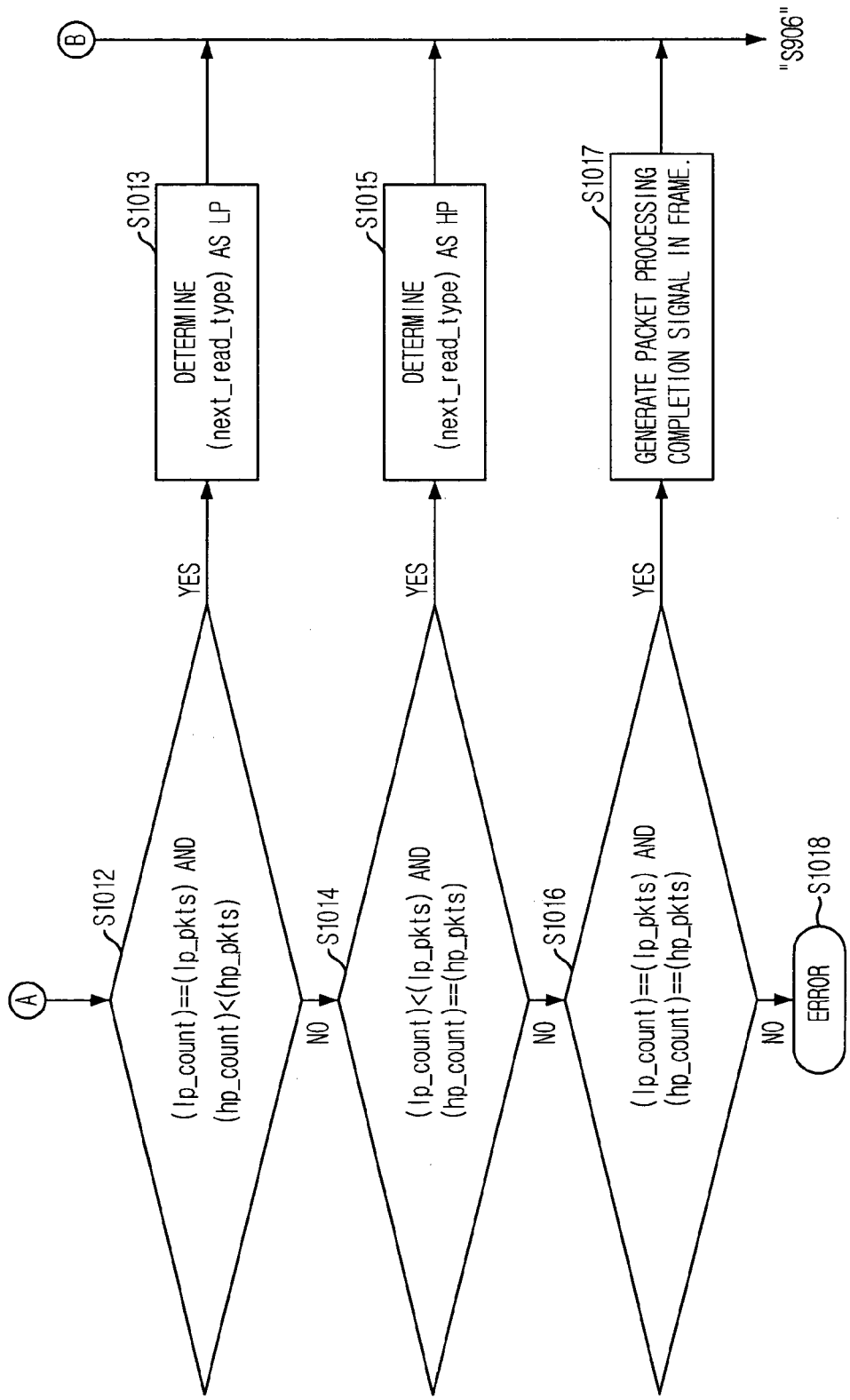

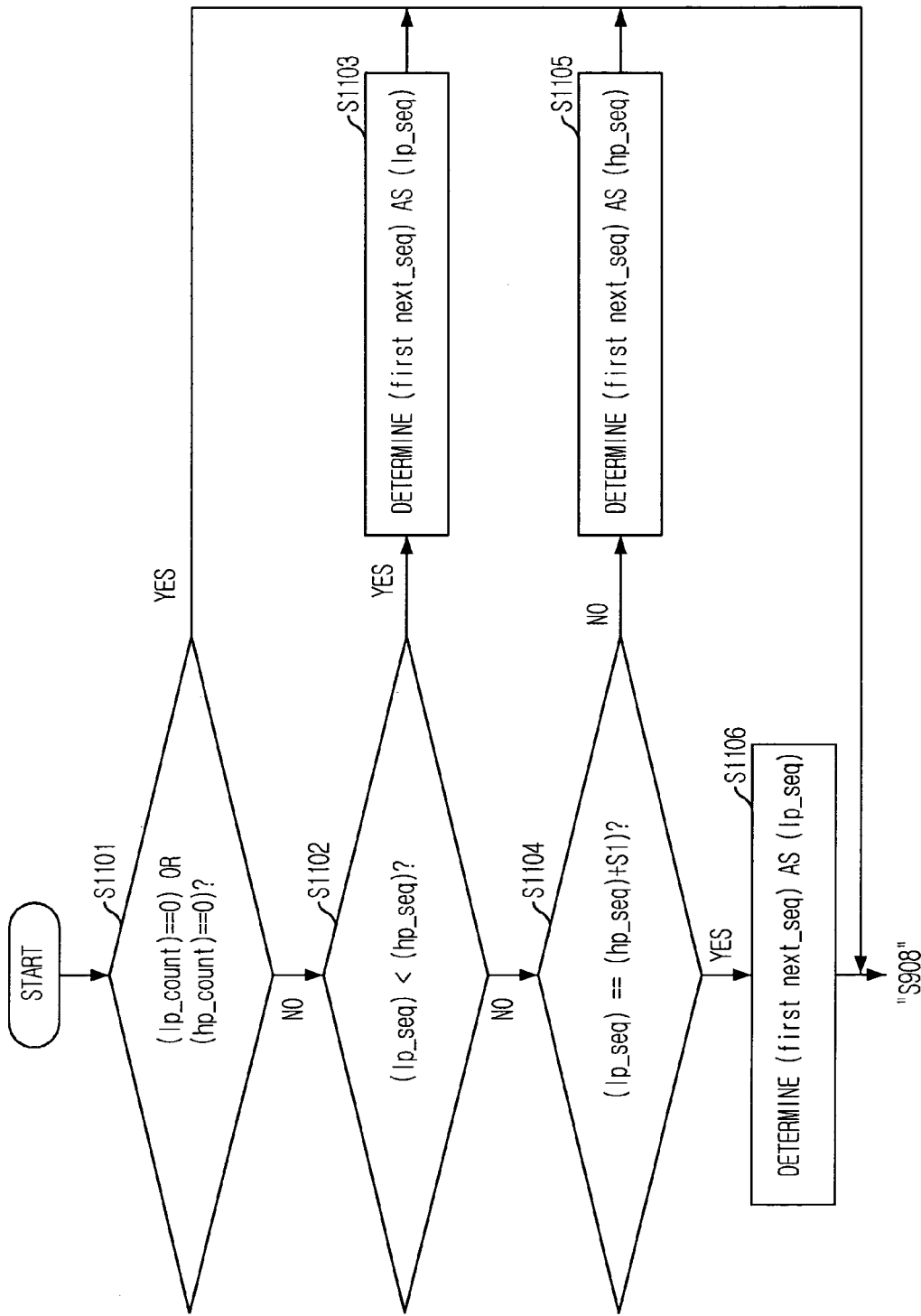

APPARATUS AND METHOD FOR TRANSMITTING HIERARCHICALLY MULTIMEDIA DATA TS TO PREVENT JITTER OF TIMING INFORMATION AND FOR RECOVERING THE MULTIMEDIA DATA TS

FIELD OF THE INVENTION

The present invention relates to an apparatus and a method for transmitting multimedia transport stream hierarchically and recovering the multimedia transmission stream; and, more particularly, to an apparatus and a method for dividing packets included in the multimedia transport stream based on priorities of the packets hierarchically and transmitting the divided packets, wherein a high priority layer packet having timing information is transmitted along with position information of the packet, at a transmitter, and for recovering location of the packets in the multimedia transport stream based on the position information at a receiver, to thereby prevents jitter of the timing information of the packets.

DESCRIPTION OF RELATED ART

Nowadays, in a digital video broadcasting-terrestrial (DVB-T) and a digital video broadcasting-satellite 2 (DVB-S2), there are research activities for standardization that data to be transmitted is divided based on contents of the data and then transmitted, a part of or all of the transmission data can be received in accordance with channel environments.

A hierarchical transmission method, which can provide an appropriate broadcasting service or an appropriate data transmission service in various channel environments, is considered as a standard for a next generation broadcasting/communication service.

In a conventional hierarchical transmission method, only channel encoding/decoding and modulation/demodulation are worked, peripheral devices necessary for implementing the hierarchical transmission method are not discussed.

Most of the conventional hierarchical transmission methods are not used in real, because it is difficult the multimedia data stream, e.g., moving picture experts group (MPEG) transport stream (TS) to be restored based on the a part of packets, if the channel environment is poor or only the part of packets, which are in a desired layer, are received.

Furthermore, original MPEG TS transmitted at the hierarchical transmitter are not restored, locations of the packets each having a program clock reference (PCR) is changed, to thereby occur jitter of the timing information.

In order to solve the problems, it is proposed a method that divides an independent MPEG TS into a different layer and transmits the MPEG TS. However, this method is difficult to be implemented and takes much cost. Also, in order to selectively receive the MPEG TS in a different layer, the receiver should include a special demultiplexing unit having a plurality of demultiplexers.

When dividing the MPEG TS and transmitting the divided MPEG TS, in order to select a layer of the MPEG TS at the receiver, the receiver should exactly recover the MPEG TS including the timing information. In order to exactly restore the MPEG TS at the receiver, the transmitter should include an additional re-multiplexer to generate MPEG TS having a new type of timing information in each layer. Even though the re-multiplexer is used, there is a problem in that it is difficult the receiver to receive the MPEG TS in every layer simultaneously.

It is proposed another conventional method for preventing the jitter that changes the PCR of the MPEG TS in appropriate to MPEG TS generated in the receiver. However, in order to exactly change the PCR, the receiver needs an additional circuit which is considerably complex.

SUMMARY OF THE INVENTION

It is, therefore, an object of the invention to provide an apparatus and a method for dividing packets included in the multimedia transport stream based on priorities of the packets hierarchically and transmitting the divided packets, wherein a high priority layer packet having timing information is transmitted along with position information of the packet, at a transmitter, and for recovering location of the packets in the multimedia transport stream based on the position information at a receiver, to thereby prevent jitter of the timing information of the packets.

In accordance with an aspect of the present invention, there is provided an apparatus for transmitting a multimedia data transport stream (TS) hierarchically in order to prevent jitter of timing information of the multimedia data TS, the apparatus including: an input matching unit for dividing the multimedia data transport stream into packets; a sequence number inserting unit for inserting a sequence number to the packet based on a receipt order of the packet, to thereby generate a sequence number inputted packet; an error check code (ECC) inserting unit for inserting an ECC to the sequence number inputted packet, to thereby generate a user packet; a layer information storing unit for storing layer information for the user packet; a layer dividing unit for dividing the user packet based on the layer information; a layer storing unit for storing the divided user packet in each layer; and a hierarchical framing and transmitting unit for generating a hierarchical transport frame by combining a predetermined number of the user packets with the layer information, and transmitting the hierarchical frame in a different transmission method for a different layer.

In accordance with other aspect of the present invention, there is provided an apparatus for recovering multimedia data transport stream (TS) transmitted hierarchically, the apparatus including: a transport frame receiving and user packet extracting unit for receiving a hierarchical transport frame transmitted through a transmission channel and extracting a user packet and layer information; an error packet and layer dividing unit for deleting the user packets having an error during the transmission based on an error check code (ECC) and dividing the user packets without an error into a different layer based on the extracted layer information; a layer storing unit for storing the outputted user packet from the an error packet and layer dividing unit; a scheduling unit for recovering the location of the user packets stored in the layer storing unit in order of the original multimedia data TS based on position information of the user packet; an error check code and sequence number removing unit for removing the ECC and the position information from the recovered user packet, to thereby recover the multimedia data TS; and an output mapping unit for receiving the recovered multimedia data TS and converting a transmission rate to thereby output the multimedia data TS.

In accordance with another aspect of the present invention, there is provided a method for hierarchically transmitting a multimedia data transport stream (TS) in order to prevent jitter of timing information of the multimedia data TS, the method including the steps of: receiving a multimedia data TS from external device and dividing the multimedia data TS into packets; inserting a sequence number to the divided packet based on a receipt order of the packet and inserting an error check code (ECC) to the sequence number inputted packet, to thereby generate a user packet; dividing the ECC and sequence number inserted user packet based on layer information provided by a user, to thereby store the divided user packet hierarchically; and generating a hierarchical transport frame by combining a predetermined number of the user packets with the layer information, and transmitting the hierarchical frame in a different transmission method for a different layer.

In accordance with still another aspect of the present invention, there is provided a method for recovering a multimedia data transport stream (TS) transmitted hierarchically, the method including the steps of: receiving a hierarchical transport frame transmitted through a transmission channel and extracting a user packet and layer information from the received transport frame; deleting the user packets having an error during the transmission based on an error check code (ECC) and dividing the user packets without an error into a difference layer based on the extracted layer information to thereby storing hierarchically according to layers; recovering the location of the stored user packets in order of the original multimedia data TS by scheduling based on the position information in the user packet; removing the ECC and the position information from the recovered user packet, to thereby recover the multimedia data TS; and converting a transmission rate of the recovered multimedia data TS to thereby output the multimedia data TS.

BRIEF DESCRIPTION OF THE DRAWINGS

The above and other objects and features of the present invention will become apparent from the following description of the preferred embodiments given in conjunction with the accompanying drawings, in which:

FIGS. 10A and 10B are detail flowcharts describing a method for determining user packet to be read among layer buffers of FIG. 9 in accordance with an embodiment of the present invention;

FIG. 11 is a flowchart describing a process of determining first packet to be outputted when a receiver is reinitialized of FIG. 9 in accordance with an embodiment of the present invention.

DETAILED DESCRIPTION OF THE INVENTION

Hereinafter, an apparatus and a method for hierarchically transmitting multimedia transport stream (TS) and for recovering multimedia TS will be described in detail with reference to the accompanying drawings.

Figure 1:
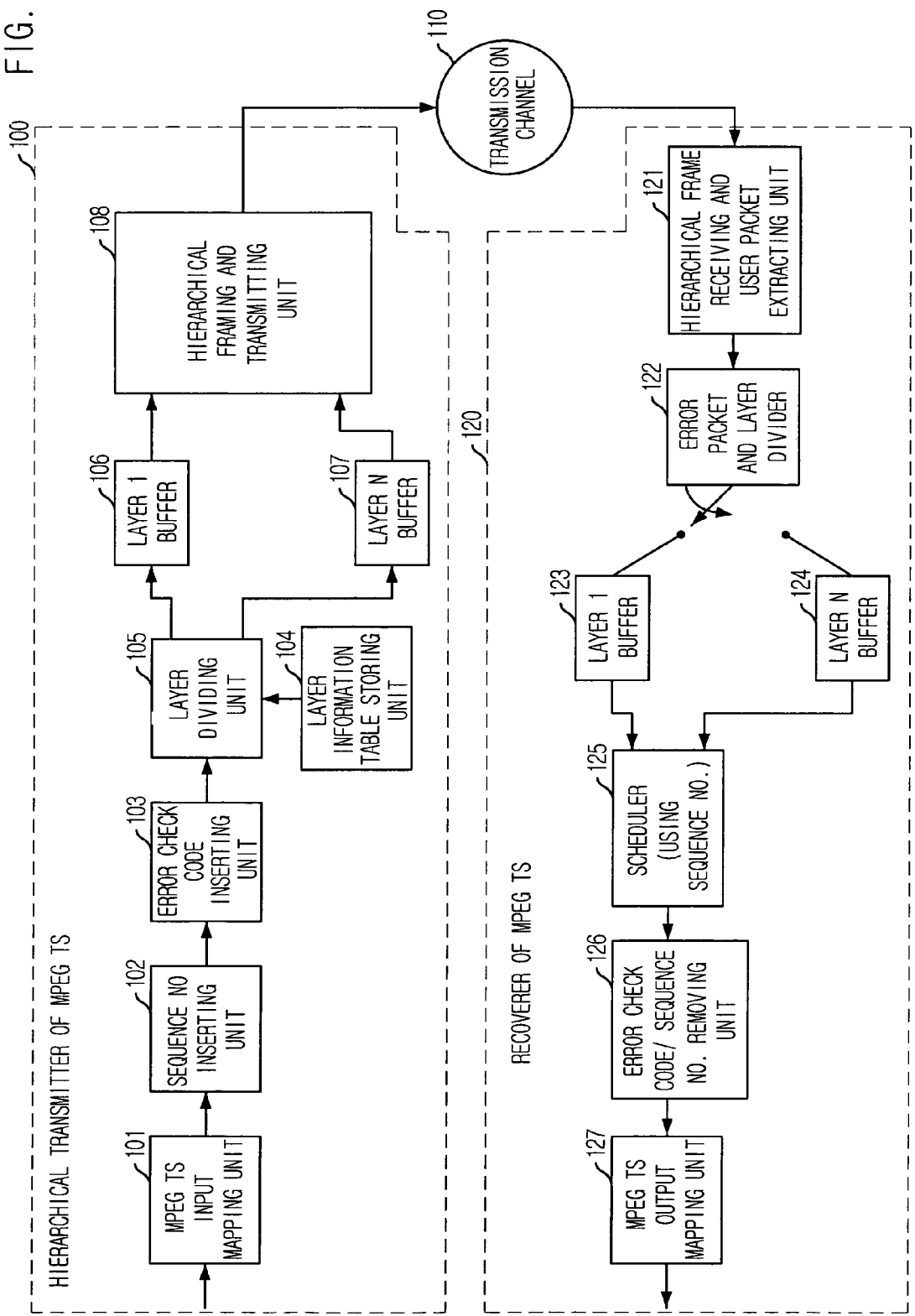
FIG. 1 is a block diagram showing an apparatus for hierarchically transmitting multimedia transport stream (TS) in order to prevent jitter of timing information and an apparatus for recovering the multimedia TS in accordance with a preferred embodiment of the present invention.

FIG. 1 is a block diagram showing an apparatus for hierarchically transmitting multimedia transport stream (TS) in order to prevent jitter of timing information and for recovering the multimedia TS in accordance with a preferred embodiment of the present invention, and shows a process of dividing, transmitting and recovering the multimedia TS into a plurality of layers. Herein, the multimedia TS is a concept including moving picture expert group (MPEG) TS, etc. and hereinafter, the MPEG TS and a program clock reference (PCR) which is timing information thereof are embodiments of the multimedia TS.

The present invention relates to a technology of dividing the MPEG TS which is generated for broadcasting or telecommunications according to contents, to thereby transmit to a different layer, and solves a PCR jitter problem occurred in a process of dividing, transmitting and recovering one MPEG TS by using hierarchical transmission method based on MPEG-2 TS in an error-able transmission channel environment.

At first, hierarchical transmitter of the MPEG TS 100 in a digital broadcasting receiving system is described as follows.

The hierarchical transmitter of the MPEG TS 100 includes a MPEG TS input mapping unit 101, a sequence number inserting unit 102, an error check code (ECC) inserting unit 103, a layer information table storing unit 104, a layer 1 buffer 106, a layer n buffer 107 and a hierarchical framing and transmitting unit 108.

Figure 2:
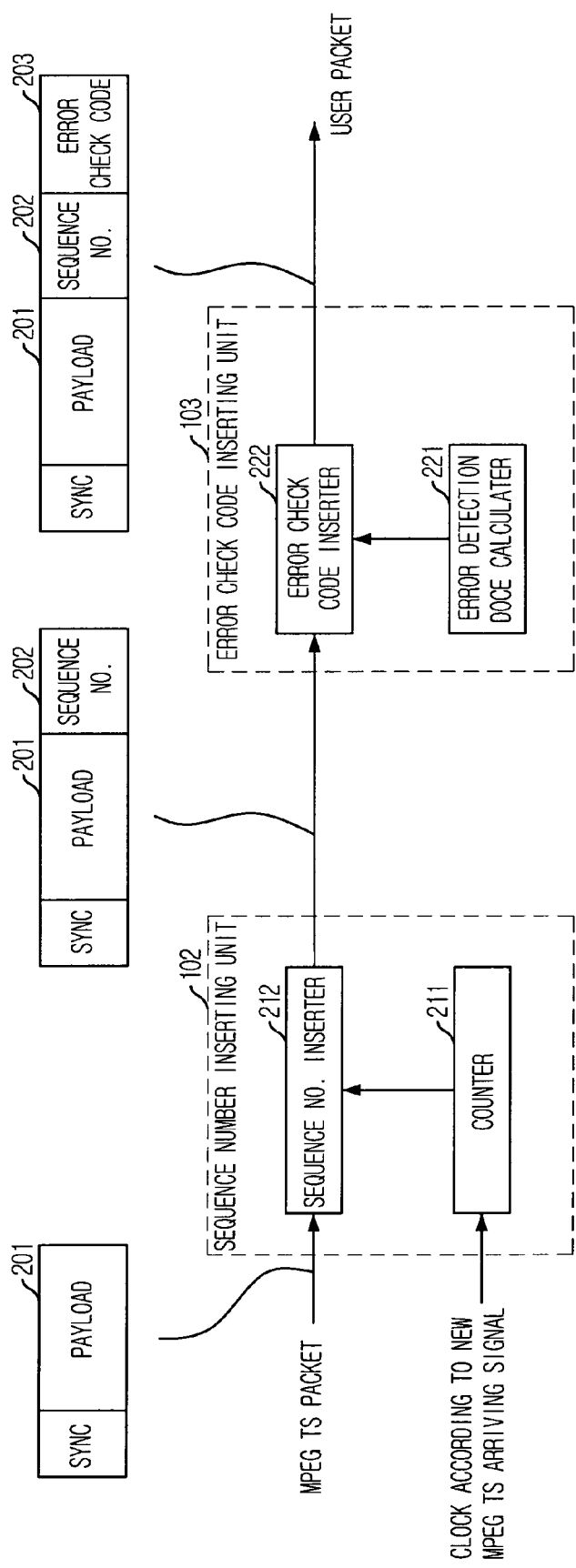
FIG. 2 is a block diagram describing a sequence number inserting unit and an error check code inserting unit of FIG. 1 in accordance with a preferred embodiment of the present invention.

The MPEG TS input mapping unit 101 receives MPEG TS from a MPEG-2 multiplexer (not shown) and divides the MPEG TS in a packet where time stamp can be inserted in order to fit to a transmission rate in a MPEG TS output mapping unit 127. Wherein, an individual packet includes a payload and a synchronizing byte (SYNC), etc. The case of that the MPEG TS input mapping unit 101 inserts the time stamp into packets is described so that the MPEG TS output mapping unit 127 can fit transmission rate based on the time stamp. However, the time stamp in the MPEG TS packet of FIG. 2 is not shown because the transmission rate can be fit using various technologies without the time stamp.

The sequence number inserting unit 102 receives a 188-byte MPEG TS packets and inserts a sequence number therein. The ECC inserting unit 103 receives the sequence number inserted packet and generates one user packet by inserting an ECC.

After above-process, a conventional hierarchical transmission is processed. That is, the layer dividing unit 105 divides an individual user packet into a different layer such as high priority (HP), low priority (LP), etc. according to layer information stored at the layer information table storing unit 104 based on information included in a header of the MPEG TS. Wherein, the user packet can be divided into two layer (e.g., the HP layer and the LP layer) or more of three layers.

When the layer dividing unit 105 divides the MPEG TS packet into a different layer, a packet including the PCR of the MPEG TS should be divided into a most stable transmission layer (i.e., the highest layer) and be transmitted. For example, in the case of two layers, the packet should be transmitted as the HP because the PCR value is clock information transmitted to a receiver from a transmitter and is an indispensable value to demultiplex at the receiver. The PCR is included in an adaptation field of the MPEG TS. Whether the PCR exists or not can be known based on 2-byte adaptation field control information.

Meanwhile, the layer information table storing unit 104 stores layer information of the individual user packet, which is provided by the user according to priorities. That is, the layer information table storing unit 104 stores information that to which layer the individual user belongs.

Individual layer buffer 106 and 107 stores the user packet belonging to each layer. The hierarchical framing and transmitting unit 108 framings the user packet stored for specific duration in order to transmitting the user packet in a packet, and then transmits an individual frame through the transmission channel 110 according to a transmission method assigned to each layer.

Wherein, a process of configuring a transport frame includes detecting the number of the user packet stored at the individual layer buffer 106 and 107 for specific time, grouping and transmitting user packets arrived during the specific time, the layer information thereof and a frame header, etc.

A transmission channel 110 can have an error and can be a wireless channel including a satellite telecommunication channel, a wireless channel including a telecommunication channel and a wired channel where a packet loss can be occur.

Then, a recoverer of the MPEG TS 120 will be described as follows.

The recoverer of the MPEG TS 120 includes a hierarchical frame receiving and user packet extracting unit 121, an error packet and layer divider 122, a layer 1 buffer 123, a layer n buffer 124, a scheduler (using the sequence number) 125, an error check code/sequence No. removing unit 126 and a MPEG TS output mapping unit 127.

The hierarchical frame receiving and user packet extracting unit 121 receives a hierarchical transport frame transmitted according to different transmission methods corresponding to the individual layer, removes the header of the hierarchical transport frame and thereby extracts user packets and layer information thereof.

The error packet and layer divider 122 removes error packet generated during the transmission based on the ECC in the user packet and stores errorless packets at corresponding layer buffer 123 and 124 by dividing into a different layer based on the information extracted from the hierarchical frame receiving and user packet extracting unit 121.

The scheduler 125 recovers the user packet stored at each layer 123 and 124 in a sequence of an original packet based on the position information such as the sequence number and outputs to the error check code/sequence No. removing unit 126.

Then, the error check code/sequence No. removing unit 126 removes the ECC and the sequence number from the recovered MPEG TS packet.

The MPEG TS output mapping unit 127 outputs the MPEG TS from which the ECC and the sequence number is removed to an external device (i.e., decoding device), wherein the final output transmission rate is synchronized to an input transmission rate of the hierarchical transmitter (more particularly, the MPEG TS input mapping unit) of the MPEG TS 100. Wherein, the transmission rate is synchronized based on the time stamp inserted into the MPEG TS.

FIG. 2 is a block diagram describing a sequence number inserting unit and an error check code inserting unit of FIG. 1 in accordance with a preferred embodiment of the present invention.

A packet of the MPEG TS 201 includes the SYNC and the payload.

Before dividing packets into layers in order to transmitting hierarchically, the sequence number inserting unit 102 inserts additional-bytes sequence number 202 into the packet for recovering transmitted MPEG TS packet at the receiver. The ECC inserting unit 103 additionally inserts ECC 203 at the end of the sequence number 202 of the packet 201 in order to check whether an error occurs or not.

The sequence number inserting unit 102 includes a counter 211 and a sequence number inserter 212. As the counter 211 (e.g., Modulo $2^{16}$ counter) increases a counting number by 1 when receiving the MPEG TS, the sequence inserter 212 inserts the sequence number 202 corresponding to the counting number at the end of the payload 201 of the MEPG TS.

Meanwhile, the ECC inserting unit 103 includes an ECC calculator 221 and the ECC inserter 222. The ECC calculator 221 calculates an error check code (ECC) in order to check whether an error occurs or not in the sequence number and the MPEG TS and then, the ECC inserter 222 inserts the calculated ECC at the end of the sequence number 202.

After, above-processes, the user packet includes the SYNC, the original MPEG TS payload 201, the sequence number 202 and the ECC 203.

Hereinafter, a process of inserting the sequence number 202 and the ECC 203 to each MPEG TS packet will be described in detail as follows.

The maximum number of the sequence number can be determined according to an assigned byte size. For example, in the case of 2-byte size of the sequence number, the sequence number will be a value from 0 to 65535 in a regular sequence. In the case of one-byte size of the sequence number, the sequence number will be a value from 0 to 255. Also, the ECC is inserted into the packet having the sequence number 202.

The ECC can be a conventional cyclic redundancy check-8 (CRC-8) or RCR-16 code. In the case of the CRC-8, the CRC-8 code can be inserted into the SYNC of a next MPEG TS or into at the end of the sequence number 202 in additional bytes.

After above-process, the 188-byte MPEG TS becomes a user packet including the sequence number 202 and the ECC 203, etc.

Figure 3:
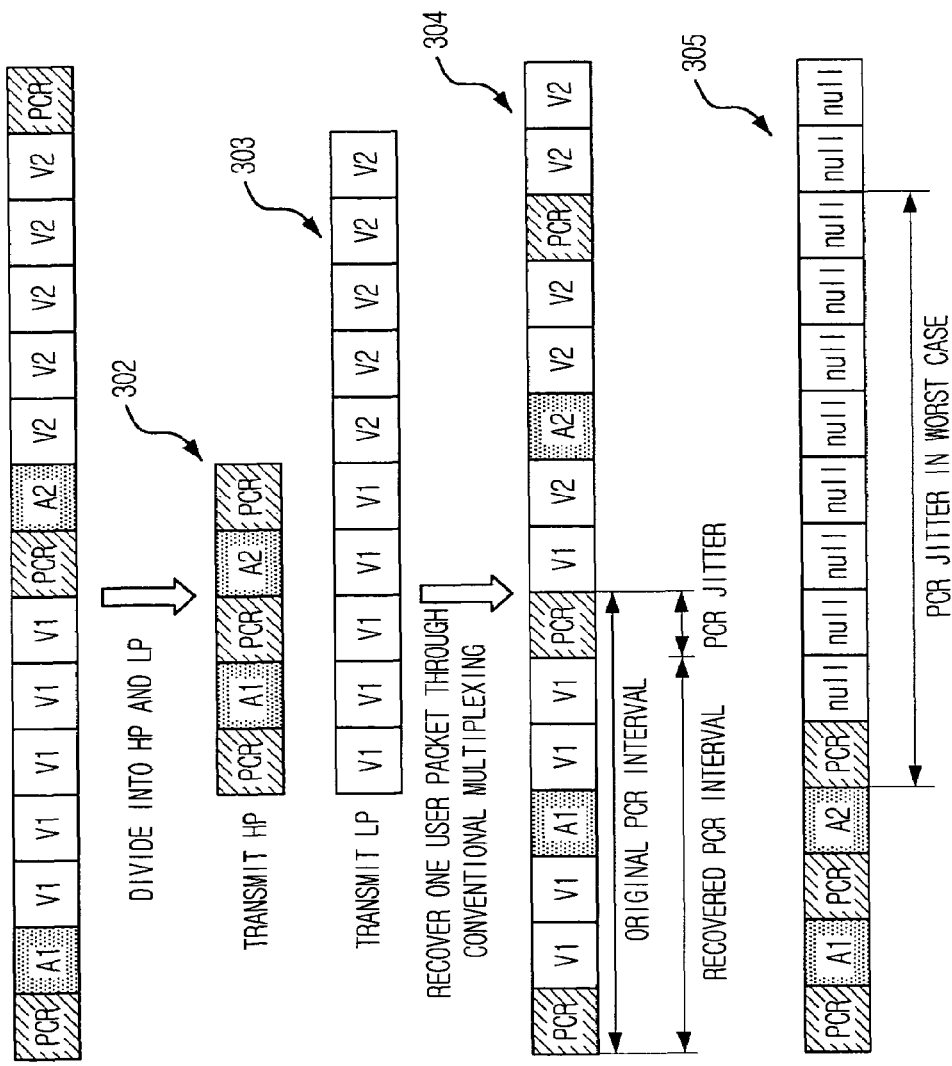
FIG. 3 is a block diagram showing occurrence of (PCR) jitter due to a hierarchical transmission method.

FIG. 3 is a block diagram showing occurrence of (PCR) jitter due to a hierarchical transmission method, wherein there are two layers of high priority (HP) and low priority (LP), wherein recovering based on a conventional multiplexing method.

Figure 4:
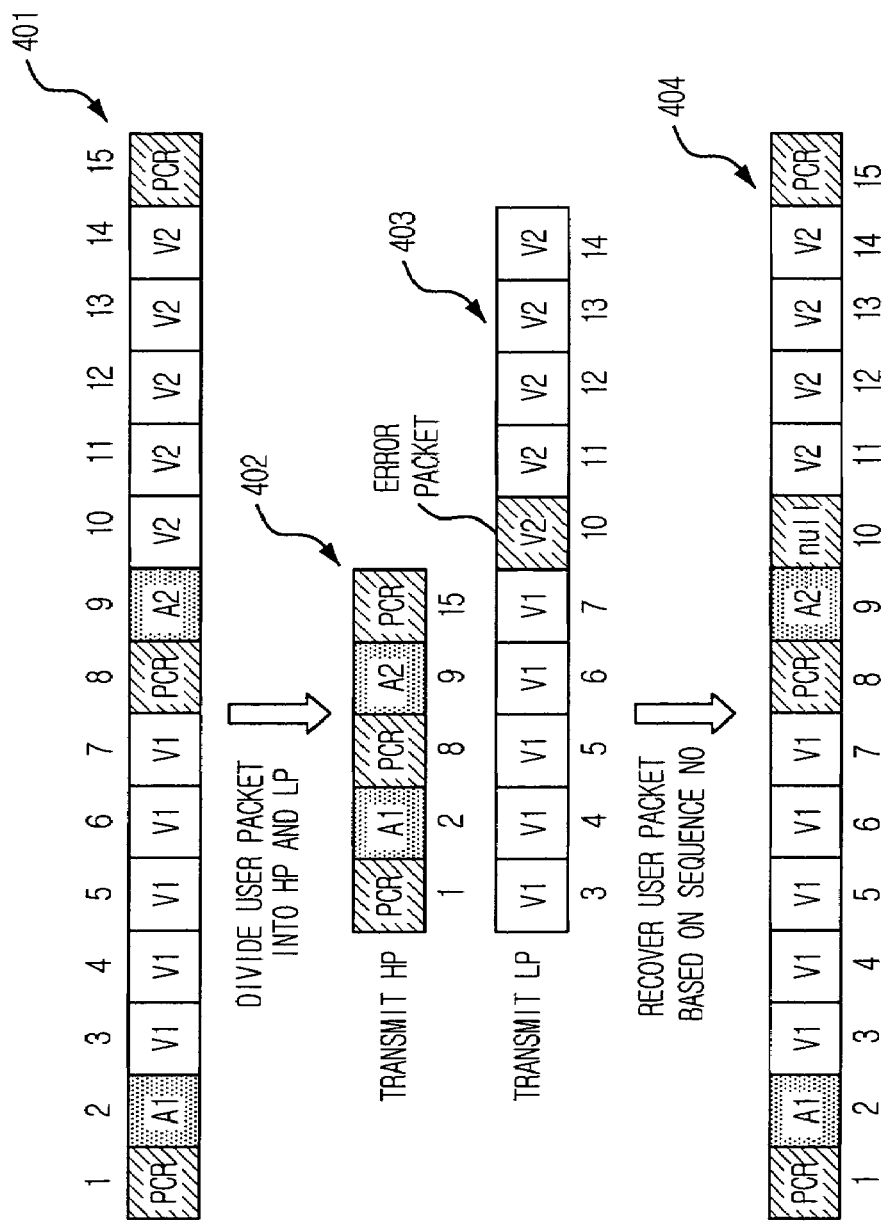
FIG. 4 is a block diagram describing a method for recovering moving picture expert group (MPEG) transport stream (TS) when a receiver received both a high priority (HP) layer and a low priority (LP) layer in accordance with an embodiment of the present invention.
Figure 5:
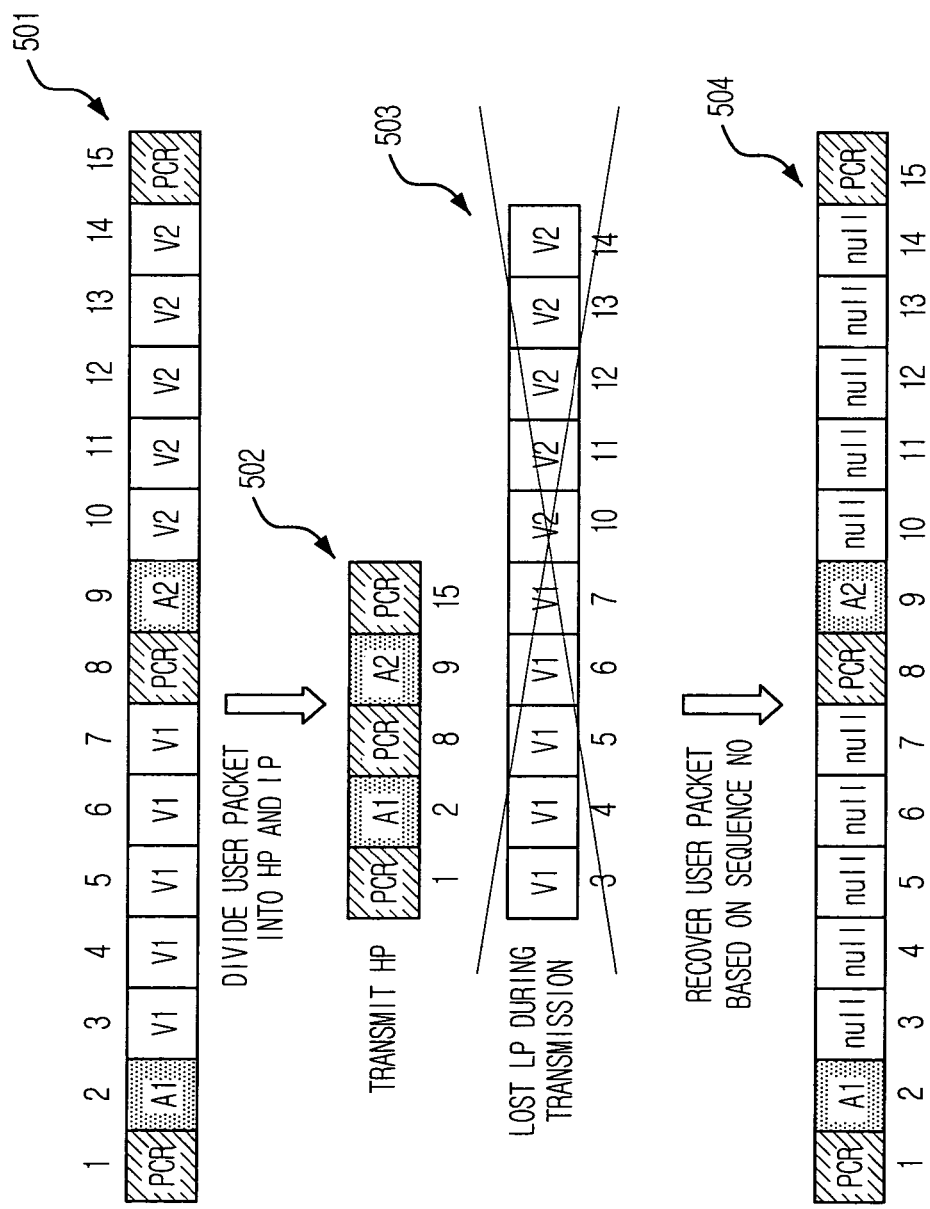
FIG. 5 is a block diagram describing a method for recovering MPEG TS when a receiver received only a HP layer in accordance with an embodiment of the present invention.
Figure 6:
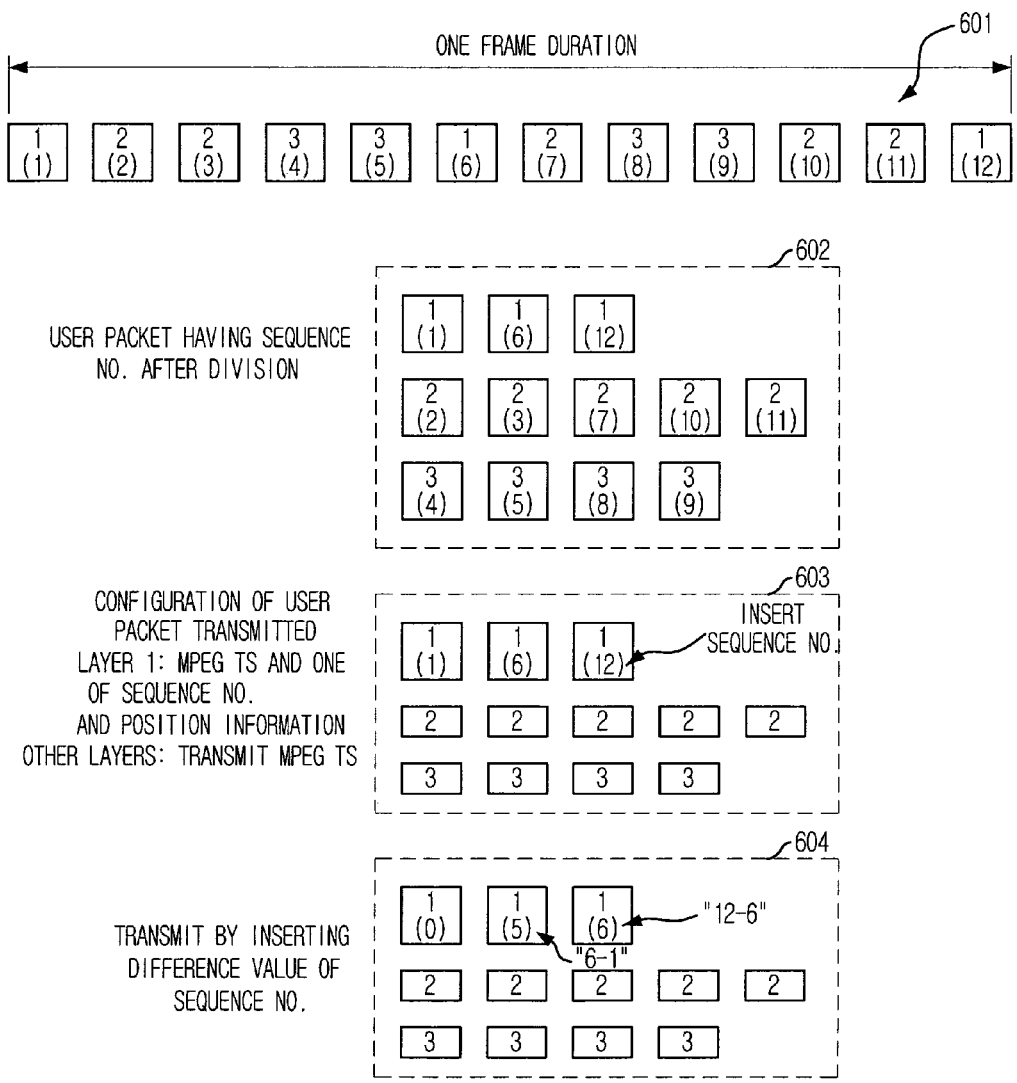
FIG. 6 is a block diagram describing a hierarchical framing of FIG. 1 and a method for transmitting position information at a transmitter in accordance with an embodiment of the present invention.

In difference with the conventional hierarchical transmission method that transmits the MPEG TS by dividing into a different layer, the apparatus of the present invention transmits one MPEG TS by hierarchically dividing. Wherein, the PCR jitter can be occurred. The transmitter of the present invention transmits the MPGE TS by inserting the sequence number thereto as shown in FIGS. 4 to 6 and the receiver of the present invention recovers location of the packets in the MPEG TS based on the sequence number.

Hereinafter, a problem of the hierarchical transmission method without inserting the sequence number is described as follows.

In the hierarchical transmission method in accordance with the present invention, one MPEG TS is divided and transmitted in a different way. However, if there are only two layers i.e., the HP and the LP, the PCR jitter can occur as shown in FIG. 3 when recovering the MPEG TS packet in the conventional multiplexing method.

For example, in the case of that an audio/video data included in one broadcasting program has one transmission method 301, the audio is transmitted in a Quadrature phase shift keying (QPSK) scheme in order to display even in a high-error environment 302. The video can be transmitted in a phase shift keying (8PSK) scheme which provides high efficiency of the transmission in order to effectively process high volume of data 303.

Wherein, when transmitting the audio and the video separately, the MPEG TS must be recovered to the original MPEG TS so that a MPEG demultiplexer of the receiver can precisely recover the transmitted MPEG TS.

However, when the packet is transmitted without the position information in the conventional hierarchical structure, the jitter can occur in a process of making one stream with packets of two layers even in an errorless environment 304. When only HP packet is transmitted, the jitter problem is getting worse 305.

Figure 9:
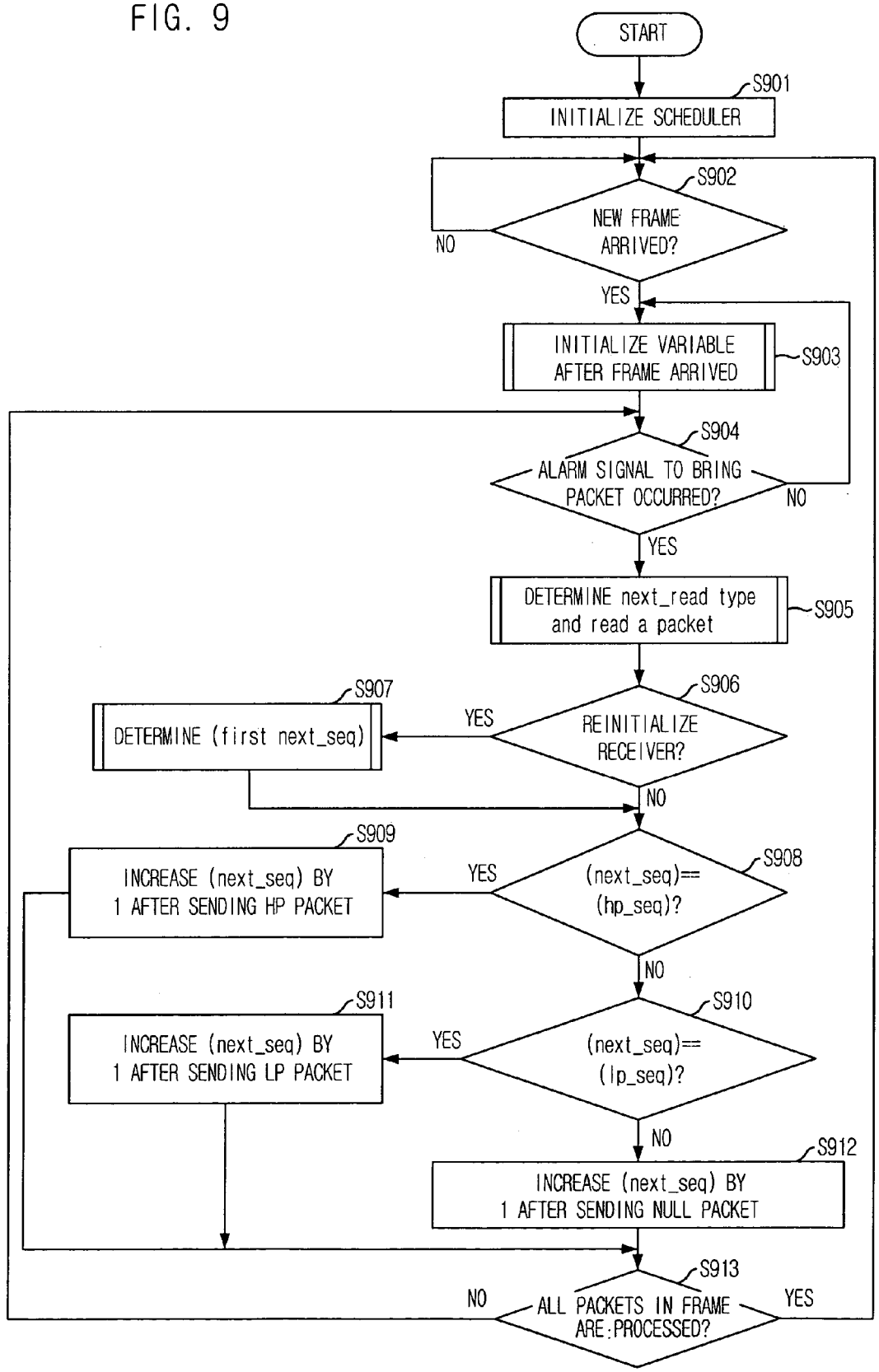
FIG. 9 is a detail flowchart describing a method for recovering MPEG TS at a scheduler of FIG. 1 when a receiver receives both HP layer and LP layer in accordance with an embodiment of the present invention.

FIG. 4 is a block diagram describing a method for recovering moving picture expert group (MPEG) transport stream (TS) when the receiver received both the high priority (HP) layer and the low priority (LP) layer in accordance with an embodiment of the present invention, and using a receiving method of FIG. 9 for a detail recovering method. Hereinafter, numbers as 1, 2, 3, etc. refer to the sequence number inserted into the MEPG TS.

When the receiver can receive both HP/LP layers, the received layers should be recovered in a sequence of the MPEG TS which is transmitted from the MPEG TS multiplexer of the transmitting part to the hierarchical transmitter of the MPEG TS 100.

The hierarchical transmitter of the MPEG TS 100 transmits the user packet 401 that has the sequence number and the ECC to the HP layer 402 and the LP layer 403. And then, the recoverer of the MPEG TS 120 recovers the user packet stored at the HP/LP buffers so that the recovered user packet has the same sequence of the original MPEG TS 401 based on the sequence number included in the user packet 404. At the result of the error check, a null packet provided by the MPEG system is inserted at the location of the deleted packet V2 (i.e., sequence 10 as refer to the FIG. 4) due to the error.

FIG. 5 is a block diagram describing a method for recovering the MPEG TS when the receiver received only the HP layer in accordance with an embodiment of the present invention, and for using a detail method of receiving schedule of FIG. 11.

When Only HP layer is received, i.e., the channel state cannot receive the LP layer 503, but can receive the HP layer 502, the null packets are inserted at the location of the LP layer and the error packet 504.

FIG. 6 is a block diagram describing a hierarchical framing of FIG. 1 and a method for transmitting position information at a transmitter in accordance with an embodiment of the present invention.

FIG. 6 is a block diagram for describing a structure including the position information, e.g., the sequence number, etc. in a layer having basic information, e.g., PCR, etc. of the MPEG TS.

One of application based on the MPEG TS is to provide data service of an internet protocol (IP) besides the video/audio transmission service. To contrast the data service, the audio/video service is not sensitive to transmission delay of each program.

Accordingly, if the MPEG TS is transmitted so that can be interpreted normally at the demultiplexer of the receiver, the packet can be normally processed after steps of demultiplex, thereby the data service can be serviced successfully. Therefore, when each program is not sensitive to the transmission delay, the location of the HP packet is able not to be changed by inserting the sequence number or the position information into only packet that has the basic information of PCR, etc., i.e., the HP layer in the MPEG TS. Wherein, the position information corresponding to the sequence number refers to a difference value between neighboring sequence numbers inserted instead of the sequence numbers.

In FIG. 6, a system having the three layers is used as an embodiment. However, there can be more layers than three layers because the number of layers is not limited for applying the method of the present invention.

Hereinafter, FIG. 6 will be described in detail.

The user packets are divided into a different layer based on a predetermined rule during first frame 601. Wherein, for hierarchical transmission, the sequence number is inserted into only the packets of the highest layer 603 instead of being inserted into all packets 602. Refer to 603, "1", "2" and "3" refers to the number of layer priority and "(1)", "(6)" and "(12)" refers to the sequence number.

The receiving part, in the process of recovering to prevent the PCR jitter, transmits the sequence ("0", "6" and "12") 603 or the difference value between neighboring sequence numbers ("0", "5" and "6") of the packet located layers with the packets 604.

Accordingly, the receiver can solve the PCR jitter problem because knowing the packet including the basic information (PCR, etc.) of the MPEG TS.

Figure 7:
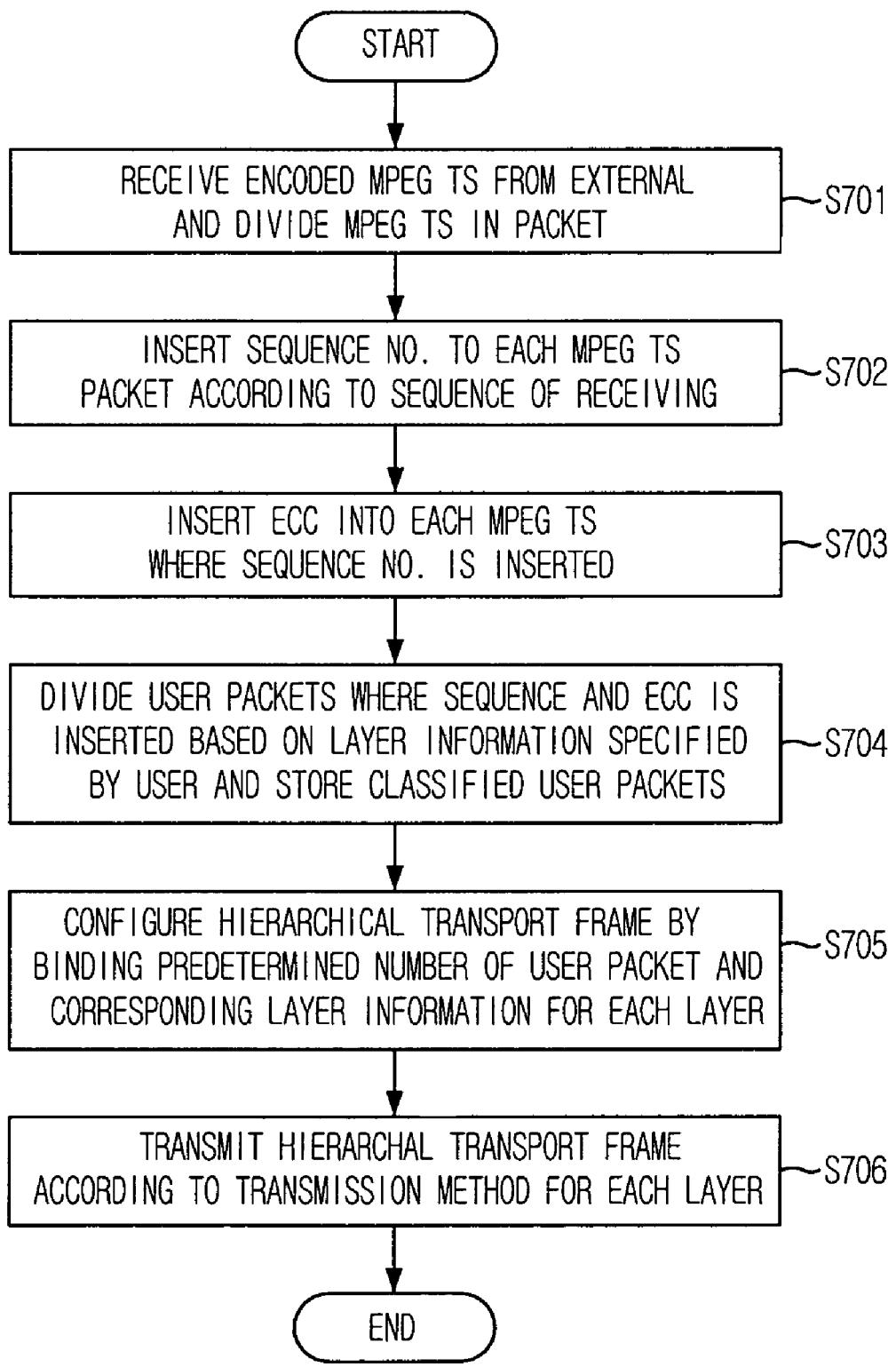
FIG. 7 is a flowchart describing a method for hierarchically transmitting multimedia TS in order to prevent jitter of timing information in accordance with an embodiment of the present invention.

FIG. 7 is a flowchart describing a method for hierarchically transmitting multimedia TS in order to prevent jitter of timing information in accordance with an embodiment of the present invention. Hereinafter, the MPEG TS and the PCR which is timing information thereof are used in an embodiment.

When describing the hierarchical transmitter of the MPEG TS 100, the method for hierarchically transmitting the MPEG TS was described. Hereinafter, only method for hierarchically transmitting the MPEG TS that is applied to the hierarchical transmitter of the MPEG TS 100 will be described.

First of all, the hierarchical transmitter 100 receives encoded MPEG TS from an external device (i.e., a MPEG-2 multiplexer of an encoder in a transmitter) and divides the MPEG TS in a packet at step S701.

The hierarchical transmitter 100 inserts the sequence number to each MPEG TS packet according to receipt order of the packets at step S702 and generates a user packet by inserting an error check code (ECC) to each MPEG TS where sequence number is inserted at step S703.

Then, the hierarchical transmitter 100 divides the user packets including the sequence number and the ECC based on layer information specified by the user and stores divided user packets at step S704. Wherein, when dividing the user packets, a user packet that has program clock reference (PCR) has to be divided as a high priority layer (HP) (if the number of layers is more than three, divides as the highest priory layer).

The hierarchical transmitter 100 generates a hierarchal transport frame by combining predetermined number of user packets and layer information thereof for each layer at step S705 and transmits the hierarchal transport frame in a different manner of the transmission method for each layer at step S706. Wherein, the hierarchical frame includes the LP packet without the sequence number and the HP packet with the sequence number. Also, the hierarchical frame can include the HP packet from which the sequence number is removed and includes difference value between the sequence numbers.

Figure 8:
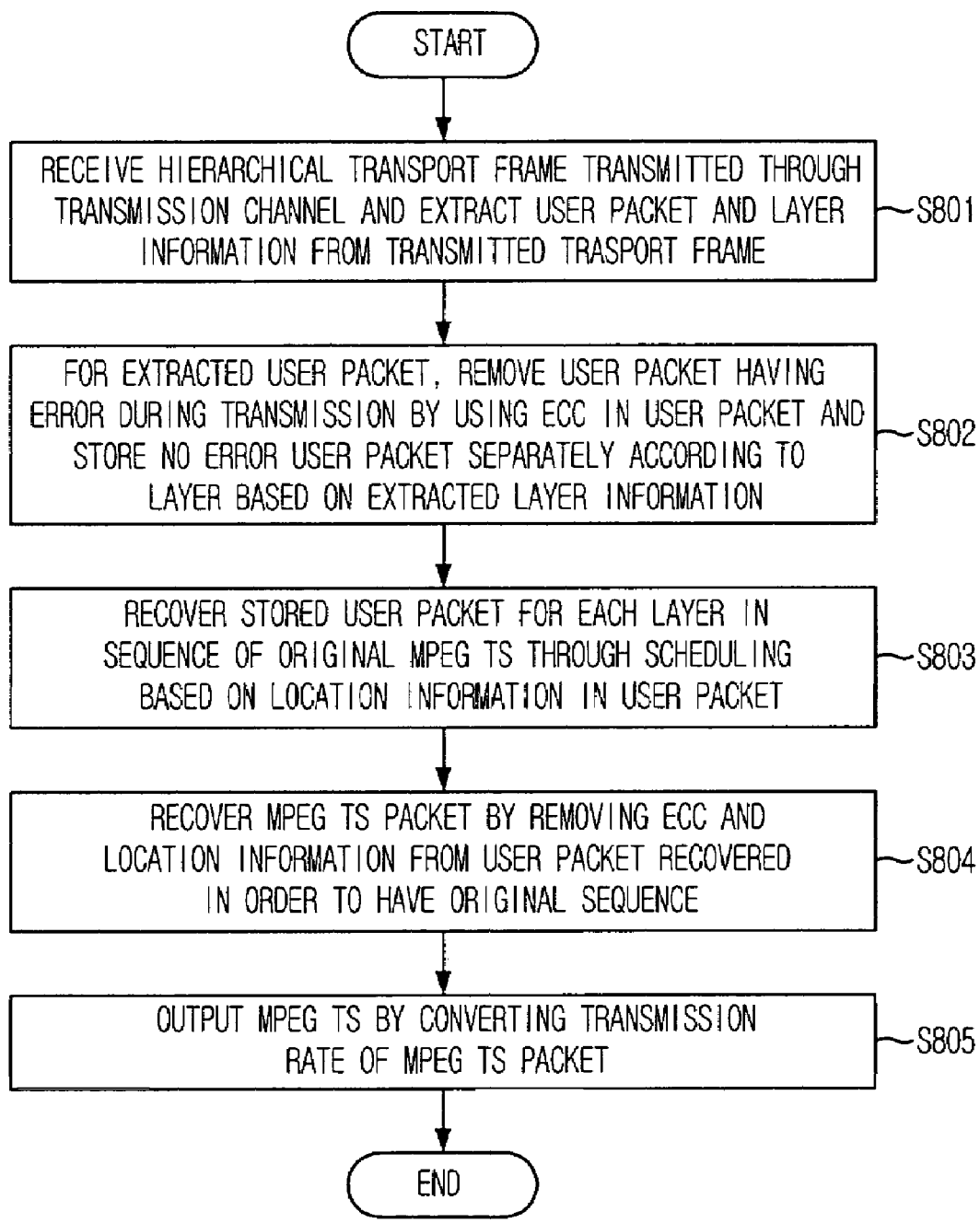
FIG. 8 is a flowchart describing a method for recovering multimedia TS transmitted hierarchically in accordance with an embodiment of the present invention.

FIG. 8 is a flowchart describing a method for recovering multimedia TS transmitted hierarchically in accordance with an embodiment of the present invention. Hereinafter, the MPEG TS and the PCR that is timing information thereof are in used in an embodiment.

When describing the recoverer of the MPEG TS 120, the method for recovering the MPEG TS was described. Herein, only method for transmitting the MPEG TS hierarchically that is applied to the recoverer of the MPEG TS 120 will be described hereinafter.

First of all, the recoverer of the MPEG TS 120 receives the hierarchical transport frame transmitted through a transmission channel and extracts the user packet and the layer information from transmitted transport frame at step S801.

Then, the recoverer of the MPEG TS 120 removes the user packet having an error during the transmission based on the ECC from the extracted user packet and stores user packet without an error according to layers based on the extracted layer information at step S802.

The recoverer of the MPEG TS 120 recovers the stored user packet for each layer in a sequence of an original MPEG TS through scheduling based on the position information in the user packet at step S803.

The recoverer of the MPEG TS 120 recovers the MPEG TS packet by removing the ECC and the position information from the user packet recovered in order to have an original sequence at step S804.

Wherein, the step S803 outputs a null packet instead of a removed error packet or a lost packet during the transmission when recovering the MPEG TS in a sequence of the original MPEG TS. Also, the position information denotes the difference value between the sequence number of the user packets and the sequence number of the user packet nearby.

The recoverer of the MPEG TS 120 outputs the MPEG TS packets by converting the transmission rate thereof at step S805.

FIG. 9 is a detail flowchart describing a method for recovering the MPEG TS at the scheduler of FIG. 1 when a receiver receives both the HP layer and the LP layer in accordance with an embodiment of the present invention.

Primary process of the recoverer of the MPEG TS 120 includes an error check based on the ECC, a packets storing for each layer and user packet recovery that the user packet stored hierarchically is recovered for having a sequence of the original MPEG TS based on the position information such as the sequence number. The structure of the user packet is referred to FIG. 2.

The error packet and layer divider 122 determines whether the error is occurred or not in each user packet based on the ECC. The error packet is not transmitted to the layer buffer because the error packet location cannot be known based on the ECC and the sequence number is not sure whether to be usable or not. That is, because the receiver cannot operate correctly if the ECC and the sequence number have an error, the error packet is not transmitted to the layer buffer.

Meanwhile, when there is no error after the error check, the user packet is stored at the corresponding layer buffer according to the layers.

Hereinafter, when the receiver receives both HP/LP layers, the method for recovering the stored user packet into state that the user packet can be interpreted by the scheduler 125 is described in detail. Hereinafter, a packet refers to the user packet of FIG. 9.

Overall system initialization which is need for scheduling process, e.g., global variables for scheduling of the receiver and allocation of layer buffers for storing packets temporarily, etc. is processed at step S901.

The scheduler 125 waits until new transport frame is arrived at step S902 and initialize the variables after new transport frame is arrived at step S903. Wherein, the hierarchical frame receiving and user packet extracting unit 121 reports to the scheduler 125 whether new frame is arrived or not.

The variables initialization will be described in detail as follows. At the time of arriving new packet, the number of packets in the HP/LP buffers, i.e., the number of the HP packets to be processed currently (hereinafter, referred to as hp_pkts) and the number of the LP packets to be processed currently (hereinafter, referred to as lp_pkts) are initialized with initial values, the numbers of packets processed (hereinafter, referred to as lp_count and hp_count) are set as 0, a type of packet to be read next (hereinafter, referred to as next_read_type) is determined as the HP and time to be needed for processing one packet, thereby an alarm signal is generated periodically.

The scheduler 125 waits until alarm signal to getting a packet is generated at step S904, determines a packet type to get and gets corresponding packet at step S905. (For more detail description, refer to processes of FIGS. 10A and 10B.)

The scheduler 125 determines whether the receiver is reinitialized or not at step S906. If not reinitialized, the scheduler 125 determines whether the next outputting packet number (hereinafter, referred to as next_seq) is equal to a sequence number of the current HP packet (hereinafter, referred to as hp_seq) or not at step S908. If reinitialized, the scheduler 125 determines first next_seq at step S907 (refer to FIG. 11) and performs step S908.

If the next_seq is equal to the hp_seq, the scheduler 125 increases the next_seq by 1 at step S909 after sending the HP packet and perform step S913. If the next_seq is not equal to the hp_seq, the scheduler 125 determines whether the next_seq is equal to the hp_seq or not at step S910.

If the next_seq is equal to the hp_seq, the scheduler 125 increases the next_seq by 1 after sending the LP packet at step S911 and performs steps S913. If the next_seq is not equal to the hp_seq, the scheduler 125 increases the next_seq by 1 after sending the null packet at step S912.

Then, the scheduler 125 determines whether all packets in the frame are processed or not at step S913. If all packets in the frame are processed, the scheduler 125 performs the step S902.

Through above-process, the scheduler 125 can transmit the packets stored at the buffers in a sequence of the original MPEG TS to the next unit, i.e., the ECC/sequence number removing unit 126.

Figure 10A:
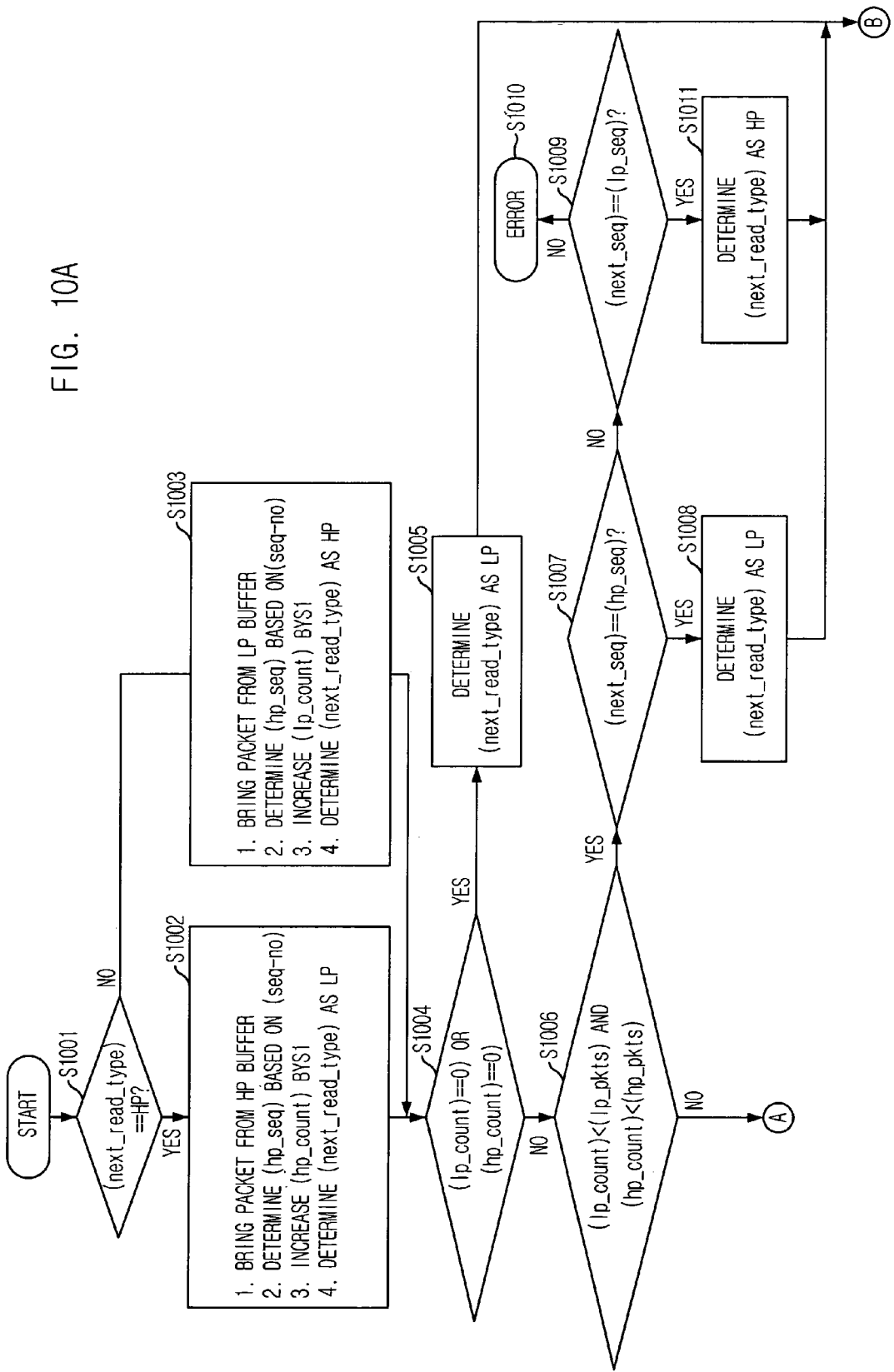

FIGS. 10A and 10B are detail flowcharts describing a method for determining the user packet to be read among layer buffers of FIG. 9 in accordance with an embodiment of the present invention and show a process of step S905 that determining a packet type to get and gets a corresponding packet of the method for recovering the MPEG TS when the receiver can receive both HP/LP layers. Hereinafter, a packet refers to the user packet in FIGS. 10A and 10B.

Whether next_read_type is the HP or not is determined at step S1001.

If the next_read_type is the HP, one packet is read from the HP buffer, the hp_seq is determined based on a sequence number of the packet (hereinafter, referred to as seq_no), the number of the HP packet currently processed from the HP buffer (hereinafter, referred to as hp_count) is increased by 1 and the next_read_type is determined as the LP at step S1002.

If the next_read_type is the LP, one packet is read from the LP buffer, the lp_seq is determined based on the seq_no, the number of the LP packet currently processed from the HP buffer (hereinafter, referred to as lp_count) is increased by 1 and the next_read type is determined as the HP at step S1003.

In accordance with the hp_count and the lp_count, there are five conditions in the scheduler 125 as follows.

Fist condition is that the lp_count or hp_count is zero at step S1004. The next_read_type determined as the LP at step S1005 in order to read the HP packet and the LP packet at the state that only the HP packet is read when new frame is arrived. Then, the step S906 is processed.

Second condition is that both of the lp_count and hp_count are not zero at step S1004 and the lp_count and the hp_count are smaller than the hp_pkts at step S1006. According to whether the next_seq is equal to the hp_seq or not, next step is determined at step S1007.

If the next_seq is equal to the hp_seq at step S1007, the next_read_type is determined as the LP at step S1008. Then, the step S906 is processed. If the next_seq is not equal to the hp_seq at step S1007 and the next_seq is equal to the lp_seq at step S1009, the next_read_type is determined as the HP at step S1011. Then, the step S906 is processed. If the next_seq is equal to neither the hp_seq nor the lp_seq at S1009, the error occurrence is reported to the user at step S1010.

Third condition is that both of the lp_count and hp_count are not zero at step S1004 and the lp_count is equal to the lp_pkts and the hp_count is smaller than the hp_pkts at step S1012. The next_read_type determined as the LP at step S1013 Then, the step S906 is processed.

Forth condition is that both of the lp_count and hp_count are not zero at step S1004 and the lp_count is smaller than the lp_pkts and the hp_count is equal to the hp_pkts at step S1014 The next_read_type determined as the HP at step S1015 Then, the step S906 is processed.

Fifth condition is that both of the lp_count and hp_count are not zero at step S1004 and the lp_count is equal to the lp_pkts and the hp_count is equal to the hp_pkts at step S1016. A packet processing completion signal is generated in a frame. Then, the step S906 is processed.

For none of the above condition, the error occurrence is reported to the user at step S1018.

FIG. 11 is a detail flowchart describing a process of determining the first next_seq at the step S907 when the receiver is reinitialized as refer to FIG. 9 in accordance with an embodiment of the present invention; and when the receiver can receive both HP/LP layers, a method for determining the first next_seq to be reinitialized of the method for recovering the MPEG TS. Hereinafter, a packet refers to the user packet of FIG. 11.

Whether the hp_count or the lp_count is zero are determined at step S1101. If one of the hp_count/lp_count is zero, the step S908 is processed in next. If neither of the hp_count/ lp_count is zero, as refer to FIG. 9, one packet is read from each of the HP buffer and the LP buffer.

Whether the hp_seq is larger than the lp_seq or not is determined at step S1102. If the hp_seq is larger than the lp_seq, the first next_seq is determined as the lp_seq at step S1103.

If the hp_seq is not larger than the lp_seq, whether the lp_seq is equal to the hp_seq+1 or not is determined at step S1104. If the lp_seq is equal to the hp_seq+1, the first next_ seq is determined as the hp_seq at step S1105. If the lp_seq is not equal to the hp_seq+1, the first next_seq is determined as the lp_seq at step S1106 and then, the step S908 is processed.

Figure 12A:
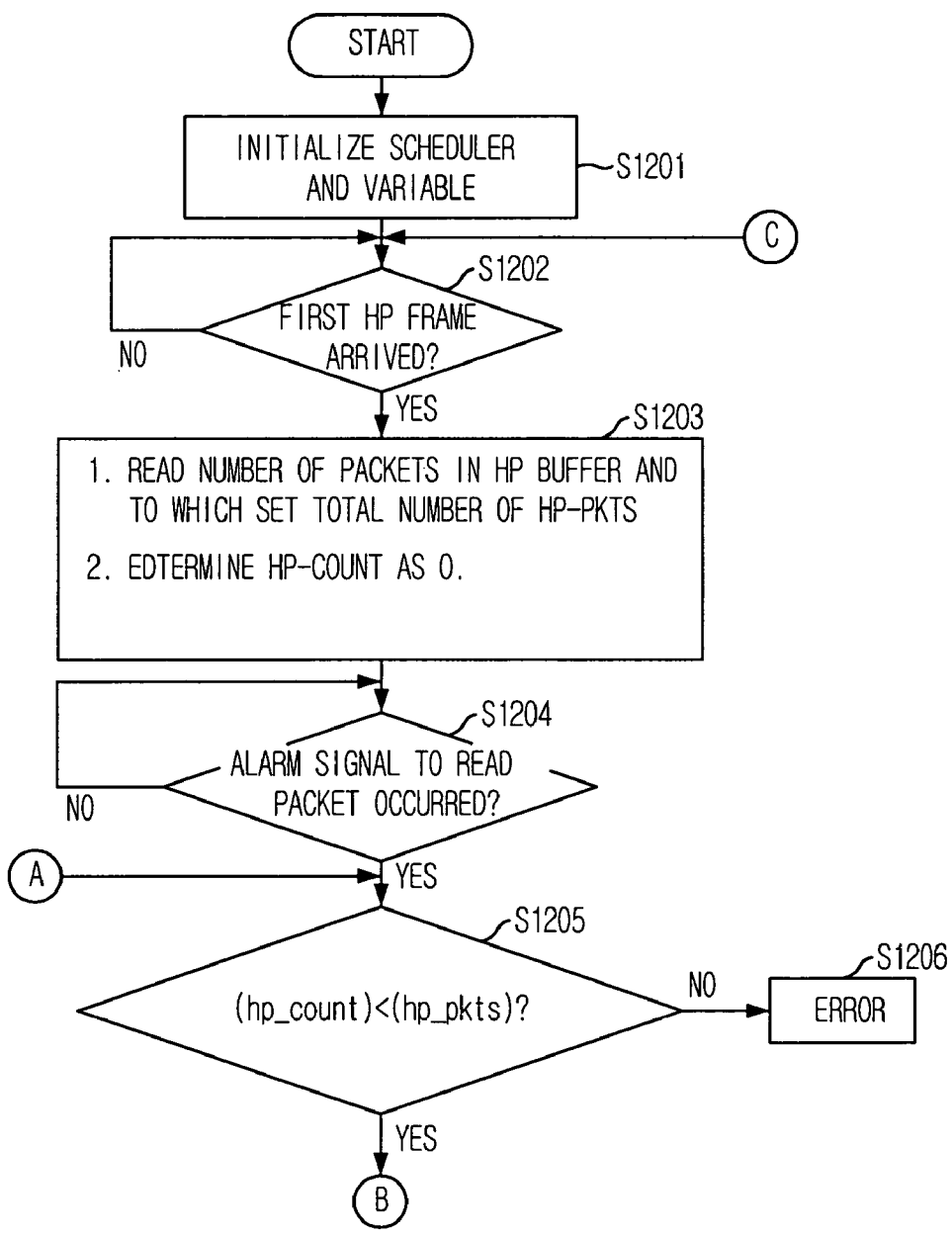
FIGS. 12A and 12B are detail flowcharts describing a method for recovering MPEG TS at a scheduler of FIG. 1 when receiver received only LP layer in accordance with an embodiment of the present invention.
Figure 12B:
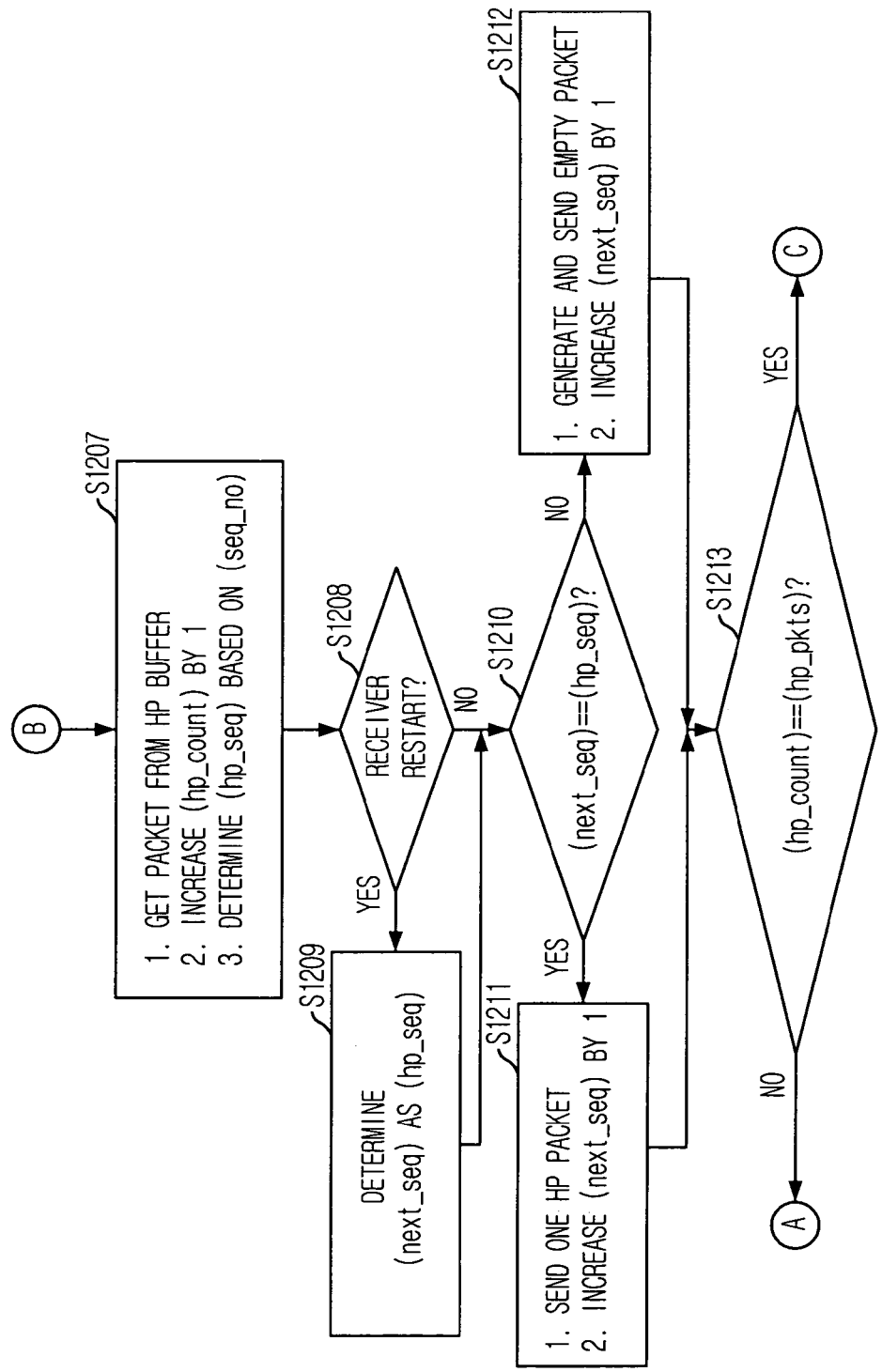

FIG. 12 is a detail flowchart describing a method for recovering the MPEG TS of the scheduler of FIG. 1 when the receiver received only HP layer in accordance with an embodiment of the present invention and shows a process of recovering as refer to FIG. 5. Hereinafter, a packet refers to the user packet in FIGS. 12A and 12B.

In a normal state of the transmission channel, the HP layer and the LP layer can be received. However, in abnormal state of the transmission channel, only HP layer can be received. Hereinafter, the method for recovering the MPEG TS stored at the HP buffer is described in detail.

The scheduler 125 is initialized for scheduling in the receiver e.g., by initialing global variables, allocating buffer of the HP packet, etc. at step S1201. The scheduler 125 configures to generate an alarm signal in an interval of processing time of one packet.

The scheduler 125 waits until the first HP frame is arrived at step S1202 and at the time of the first HP frame is arrived, the number of packets in the HP buffer is counted and the hp_pkts is determined as the number and then, the hp_seq is determined as 0 at step S1203.

The scheduler 125 waits until the alarm signal is generated at step S1204 and at the time of the alarm signal is generated, determines whether the hp_seq is smaller than the hp_pkts or not at step S1205. If the hp_seq is smaller than the hp_pkts, the scheduler 125 gets one packet from the HP buffer, increases the hp_seq by 1 and determines the seq_no as the hp_seq at step S1207. If the hp_seq is not smaller than the hp_pkts, the scheduler 125 reports the error to the user occurred at step S1206.

The scheduler 125 determines whether the receiver is reinitialized or not at step S906. If the receiver is reinitialized, i.e., at the start of scheduling for receiving at the step S1208, the scheduler 125 determines the next_seq as the hp_seq at step S1209.

If the receiver is not reinitialized, the scheduler 125 determines whether the next_seq is equal to the hp_seq or not at step S1210. If the next_seq is equal to the hp_seq, the scheduler 125 sends the HP packet and then, increases the next_seq by 1 at step S1211. If the next_seq is not equal to the hp_seq, the scheduler 125 sends the null packet and then, increases the next_seq by 1 at step S1212.

The scheduler 125 determines whether the hp_seq is equal to the hp_pkts or not at step S1213. If the hp_seq is equal to the hp_pkts, the step S1202 is processed. If the hp_seq is not equal to the hp_pkts, the step S125 is processed.

As above-mentioned, the method of the present invention can be embodied as a program and stored in recording media (CD-ROM, RAM, floppy disk, hard disk, magneto-optical disk, etc.) readable by a computer.

The present invention makes that a transmitting part transmits an output (i.e., MPEG TS) by dividing hierarchically and the receiving part receives selectively the MPEG TS according to layers by using a conventional MPEG TS demultiplexer without using a special MPEG TS demultiplexer to thereby remarkably decrease complexity and cost of the designing a broadcasting system based on hierarchical structure.

Also, the present invention transmits a packet having important information such as the PCR included in the MPEG TS when communicating or broadcasting based on the MPEG-2 TS by using hierarchical method in an error-able environment, to thereby receive the MPEG TS in a worst channel environment.

Also, the present invention transmits the packet having the important information with position information (e.g., sequence number, etc.) so that the receiving part recovers location of the packet in order of the original MPEG TS, to thereby prevent jitter.

The present application contains subject matter related to Korean patent application No. 2003-98279, filed in the Korean intellectual Property Office on Dec. 27, 2003, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for transmitting a multimedia data transport stream (TS) hierarchically in order to prevent jitter of timing information of the multimedia data TS, the apparatus comprising:

an input matching means for dividing the multimedia data transport stream into packets;

a sequence number inserting means for inserting a sequence number to a packet based on a receipt order of the packet, to thereby generate a sequence number inputted packet;

an error check code (ECC) inserting means for inserting an ECC to the sequence number inputted packet, to thereby generate a user packet;

a layer information storing means for storing layer information for the user packet;

a layer dividing means for dividing the user packet based on the layer information;

a layer storing means for storing the divided user packet in each layer; and a hierarchical framing and transmitting means for generating a hierarchical transport frame by combining a predetermined number of the user packets with the layer information, and transmitting the hierarchical frame in a different transmission method for a different layer.

2. The apparatus as recited in claim 1, wherein the layer dividing means divides the user packet including the timing information as a high priority layer.

3. The apparatus as recited in claim 1, wherein the hierarchical framing and transmitting means generates the transport frame by removing the inserted sequence number in the low priority layer.

4. The apparatus as recited in claim 3, wherein the hierarchical framing and transmitting means removes the inserted sequence number from each high priority layer, inserts a sequence number difference value between neighboring packets and then, generates the packets to the transport frame.

5. An apparatus for recovering multimedia data transport stream (TS) transmitted hierarchically, the apparatus comprising:

a transport frame receiving and user packet extracting means for receiving a hierarchical transport frame transmitted through a transmission channel and extracting a user packet and layer information;

an error packet and layer dividing means for deleting the user packet having an error during the transmission based on an error check code (ECC) and dividing the user packet without an error into a different layer based on the extracted layer information;

a layer storing means for storing an outputted user packet from the an error packet and layer dividing means;

a scheduling means for recovering the location of the user packet stored in the layer storing means in order of the original multimedia data TS based on position information of the user packet;

an error check code and sequence number removing means for removing the ECC and the position information from the recovered user packet, to thereby recover the multimedia data TS; and an output mapping means for receiving the recovered multimedia data TS and converting a transmission rate to thereby output the multimedia data TS.

6. The apparatus as recited in claim 5, wherein the scheduling means outputs the user packet stored in the layer storing means based on the position information of the user packet in order of the original multimedia data TS to the ECC and sequence number removing means, and a null packet is outputted in the location of the user packet deleted due to an error at the an error packet and layer dividing means or the lost user packet instead thereof.

7. The apparatus as recited in claim 6, wherein the position information is a difference value between the sequence number of the user packet and the neighboring user packets.

8. The apparatus as recited in claim 7, wherein the output mapping means converts the multimedia data TS based on a time stamp when there is the time stamp in the multimedia data TS.

9. A method for hierarchically transmitting a multimedia data transport stream (TS) in order to prevent jitter of timing information of the multimedia data TS, the method comprising the steps of:

a) receiving a multimedia data TS from external device and dividing the multimedia data TS into packets;

b) inserting a sequence number to the divided packet based on a receipt order of the packet and inserting an error check code (ECC) to the sequence number inputted packet, to thereby generate a user packet;

c) dividing the ECC and sequence number inserted user packet based on layer information provided by a user, to thereby store the divided user packet hierarchically; and d) generating a hierarchical transport frame by combining a predetermined number of the user packets with the layer information, and transmitting the hierarchical frame in a different transmission method for a different layer.

10. The method as recited in claim 9, wherein in the step c), the user packet is divided hierarchically based on the layer information provided by the user and the user packet having the timing information is divided as a high priority layer.

11. The method as recited in claim 10, wherein in the step c), the inserted sequence number is removed from low priority layer packets to thereby generate transport frame.

12. The method as recited in claim 11, wherein in the step d), the inserted sequence number is removed from a priority layer packet and a difference value of the sequence number between neighboring user packets is inserted to thereby generate the transport frame.

13. A method for recovering a multimedia data transport stream (TS) transmitted hierarchically, the method comprising the steps of:

a) receiving a hierarchical transport frame transmitted through a transmission channel and extracting a user packet and layer information from the received transport frame;

b) deleting the user packet having an error during the transmission based on an error check code (ECC) and dividing the user packet without an error into a difference layer based on the extracted layer information to thereby storing hierarchically according to layers;

c) recovering a location of the stored user packets in order of the original multimedia data TS by scheduling based on the position information in the user packet;

d) removing the ECC and the position information from the recovered user packet, to thereby recover the multimedia data TS; and e) converting a transmission rate of the recovered multimedia data TS to thereby output the multimedia data TS.

14. The method as recited in claim 13, wherein in the step c), the user packet is recovered based on the position information of the user packet in order of the original multimedia data TS, and a null packet is outputted in the location of the user packet deleted due to an error at the an error packet and layer dividing means or the lost user packet instead thereof.

15. The method as recited in claim 14, wherein the position information is a difference value between the sequence number of the user packet and the neighboring user packets.

* * * * *